US009245482B2

(12) United States Patent
Ishii et al.

(10) Patent No.: US 9,245,482 B2
(45) Date of Patent: *Jan. 26, 2016

(54) IMAGE DISPLAY DEVICE

(71) Applicant: Hitachi-LG Data Storage, Inc., Minato-ku, Tokyo (JP)

(72) Inventors: Yasunori Ishii, Yokohama (JP); Fumio Haruna, Yokohama (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 6 days.

This patent is subject to a terminal disclaimer.

(21) Appl. No.: 14/198,870

(22) Filed: Mar. 6, 2014

(65) Prior Publication Data
US 2015/0022568 A1    Jan. 22, 2015

(30) Foreign Application Priority Data
Jul. 18, 2013 (JP) .................................. 2013-149140

(51) Int. Cl.
*G09G 5/10* (2006.01)
*G09G 3/34* (2006.01)
(Continued)

(52) U.S. Cl.
CPC ............ *G09G 3/3406* (2013.01); *G02B 26/101* (2013.01); *G03B 21/2013* (2013.01); *G03B 21/2033* (2013.01); *G03B 33/06* (2013.01); *H04N 9/3161* (2013.01); *H04N 9/3182* (2013.01); *H04N 9/3194* (2013.01)

(58) Field of Classification Search
CPC ........... G09G 5/10; G09G 5/02; G09G 3/002; G02B 26/08; G02B 26/0833; G02B 26/0841; G02B 5/282; G02B 6/3598
See application file for complete search history.

(56) References Cited

U.S. PATENT DOCUMENTS

2002/0164157 A1* 11/2002 Hori et al. ..................... 386/127
2006/0022214 A1*  2/2006 Morgan et al. ................. 257/99
(Continued)

FOREIGN PATENT DOCUMENTS

JP     2006-343397 A    12/2006
JP     2009-15125 A      1/2009

OTHER PUBLICATIONS

Extended European Search Report, dated Nov. 19, 2014, which was issued during the prosecution of European Patent Application No. 14157909.4, which corresponds to the present application.

*Primary Examiner* — Ricardo L Osorio
(74) *Attorney, Agent, or Firm* — Baker Botts L.L.P.

(57) ABSTRACT

The white balance for a high brightness region and a low brightness region is improved in an image display device using MEMS and a laser light source. An image processing unit of the device superposes a signal based on a first measured value of a light quantity at a first temperature on a picture signal, during its blanking period, which is supplied to the laser light source, and superposes a high frequency signal on the picture signal during its effective scanning period. An amplification factor of the light source drive unit is changed so that a second measured value at a second temperature comes close to the first measured value at the first temperature as a target value based on the second measured value at which the light quantity of light generated at the laser light source is measured at the second temperature different from the first temperature on the signal based on the first measured value. By superposition of the high frequency signal, white balance control in a low brightness region for which control is especially difficult is performed with adequate accuracy.

7 Claims, 6 Drawing Sheets

(51) Int. Cl.
*G02B 26/10* (2006.01)
*H04N 9/31* (2006.01)
*G03B 21/20* (2006.01)
*G03B 33/06* (2006.01)

(56) References Cited

U.S. PATENT DOCUMENTS

| | | |
|---|---|---|
| 2008/0094676 A1 | 4/2008 | Lach et al. |
| 2008/0130693 A1* | 6/2008 | Mizusako et al. ............ 372/28 |
| 2010/0097534 A1 | 4/2010 | Teller et al. |
| 2010/0176310 A1* | 7/2010 | Moriya et al. ............ 250/493.1 |
| 2011/0074837 A1 | 3/2011 | Takeda et al. |
| 2011/0109667 A1 | 5/2011 | Kim et al. |
| 2011/0181791 A1 | 7/2011 | Huang et al. |
| 2011/0242496 A1* | 10/2011 | Kimoto et al. ................. 353/31 |
| 2012/0062849 A1 | 3/2012 | Kuo et al. |
| 2012/0140185 A1* | 6/2012 | Masuda ......................... 353/31 |
| 2012/0249976 A1* | 10/2012 | Shibasaki et al. ............... 353/52 |
| 2013/0207950 A1 | 8/2013 | Haruna et al. |
| 2014/0078474 A1* | 3/2014 | Nakao et al. .................... 353/33 |
| 2014/0253527 A1* | 9/2014 | Ogi et al. ...................... 345/207 |
| 2014/0285536 A1* | 9/2014 | Haruna et al. ................ 345/690 |

* cited by examiner

US 9,245,482 B2

IMAGE DISPLAY DEVICE

INCORPORATION BY REFERENCE

The present application relates to and claims priority from Japanese Patent Application No. 2013-149140 filed on Jul. 18, 2013, the entire disclosure of which is incorporated herein by reference.

BACKGROUND OF THE INVENTION (1) Field of the Invention

The present invention relates to an image display device using MEMS (Micro Electro Mechanical Systems).

(2) Description of the Related Art

In recent years, as one of image display devices, a small-sized projection projector is popular, which uses MEMS and a semiconductor laser light source. For example, Japanese Patent Application Laid-Open No. 2006-343397 discloses a projector, in which images are projected by scanning a two-axis MEMS mirror horizontally and vertically and by simultaneously modulating a laser light source. Further, Japanese Patent Application Laid-Open No. 2009-15125 discloses a method for compensating for brightness change in a projected image in a projection projector.

SUMMARY OF THE INVENTION

A semiconductor laser for use in a small-sized projection projector has a problem in that the white balance of a display screen is changed because the light quantity and forward current characteristics of the semiconductor laser are changed depending on the temperature. However, white balance adjustment remains beyond discussion in the techniques disclosed in the above-mentioned patent documents.

In low brightness, there is a characteristic in which light quantity rises steeply with an increase of a forward current and it is especially difficult to compensate a temperature-dependent characteristic of white balance. Hence, a problem posed is to facilitate white balance adjustment in low brightness.

An object of the present invention is to provide a laser projection projector as an image display device implemented such that white balance adjustment in low brightness is facilitated.

In order to solve the problem, the present invention is an image display device that externally projects generated light and displays an image, the image display device including: a light source configured to generate the light; a light source drive unit configured to superpose a high frequency (HF) signal on a picture signal supplied, drive the light source, and control, typically, a light quantity of the light; a reflecting mirror configured to reflect light generated at the light source and externally project the light, a direction to reflect the light being movable; a reflecting mirror drive unit configured to drive the reflecting mirror and control the direction to reflect the light based on a synchronization signal supplied; an image processing unit configured to process a first picture signal inputted to the image display device, supply a second picture signal for the image externally displayed to the light source drive unit, and supply a synchronization signal for the second picture signal to the reflecting mirror drive unit; an optical sensor configured to measure a light quantity of light generated at the light source and supply a measured value to the image processing unit; and a temperature sensor configured to measure a temperature of the light source and supply a measured value to the image processing unit. The image processing unit superposes a signal based on a first measured value of the light quantity measured at the optical sensor on the second picture signal to be supplied to the light source drive unit in a state in which the light source drive unit is set to drive the light source at a set first temperature. The image processing unit controls the light source drive unit so that a second measured value at a second temperature comes close to the first measured value at the first temperature as a target value based on the second measured value at which a light quantity of light generated at the light source is measured at the optical sensor at the second temperature different from the first temperature on the signal based on the first measured value.

According to the present invention, there are effects as follows: it is possible to provide an image display device implemented such that white balance adjustment in low brightness is facilitated; and it is possible to provide a laser projection projector in which white balance that is stable from high brightness to low brightness is obtained.

DETAILED DESCRIPTION OF THE EMBODIMENT

Figure 1:
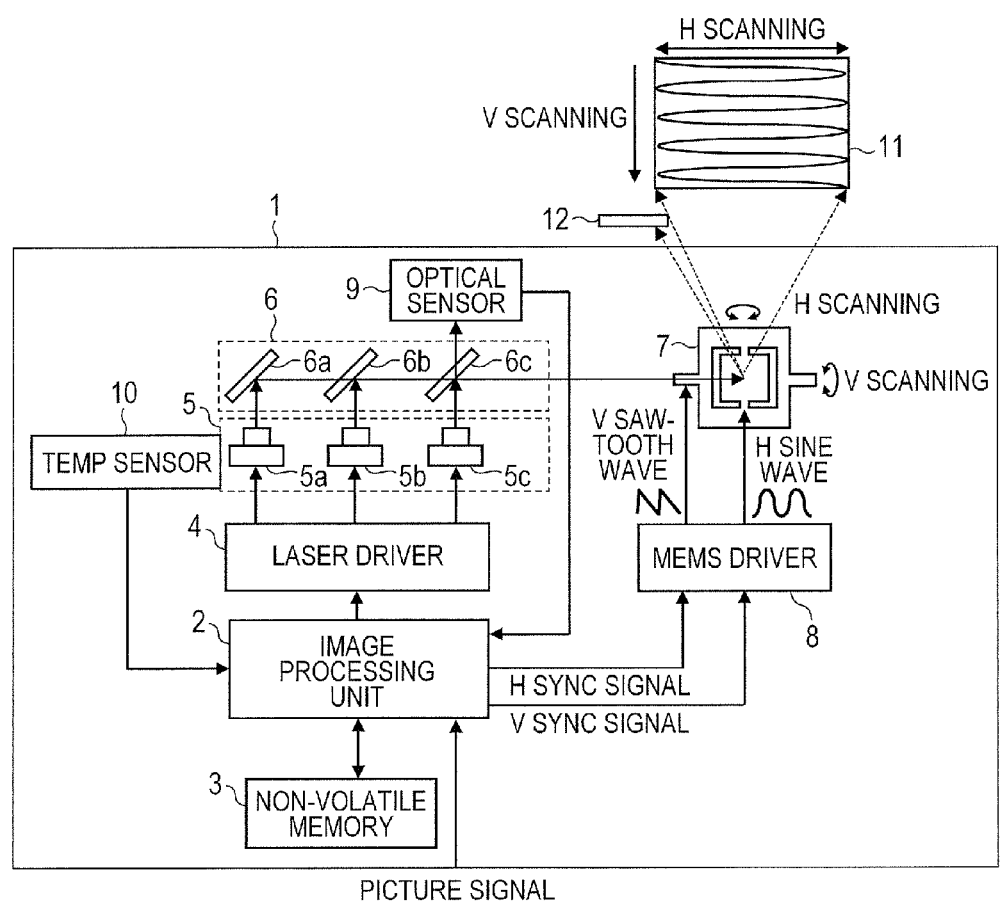
FIG. 1 is a block diagram of the basic configuration of a projection projector according to an embodiment.

In the following, an embodiment of the present invention will be described in detail with reference to the drawings. It is noted that in all the drawings for explaining the embodiment, the same components are designated the same reference numerals and signs in principle, and the overlapping description is omitted.

FIG. 1 is a block diagram of an exemplary configuration of a projection projector using MEMS according to the embodiment. A projection projector 1 includes an image processing unit 2, a non-volatile memory 3, a laser driver 4, a laser light source 5, a reflecting mirror 6, a MEMS 7, a MEMS driver 8, an optical sensor 9, a temperature sensor 10, and a light shielding plate 12. It is noted that a display image 11 is an image displayed by externally projecting a laser beam from the projection projector 1. The image processing unit 2 applies various schemes of correction to an externally inputted picture signal to generate an image signal, and generates a horizontal synchronization signal and a vertical synchronization signal in synchronization with the generated image signal. Moreover, the image processing unit 2 controls the laser driver 4 according to the light quantity acquired from the optical sensor 9 and the temperature of the laser light source 5 acquired from the temperature sensor 10, and adjusts the white balance to be constant. The detail will be described later.

Here, various schemes of correction performed at the image processing unit 2 mean that the image processing unit 2 corrects image distortion caused due to scanning performed by the MEMS 7, for example. More specifically, image distortion is caused due to the difference in a relative angle between the projection projector 1 and the projection surface and to the optical axial displacement between the laser light source 5 and the MEMS 7, for example. The laser driver 4 receives the image signal outputted from the image processing unit 2, and modulates a current value to be supplied to the laser light source 5 based on the data values of the image signal. For example, in the case where a high gray scale image is displayed, a current flow rate to the laser light source 5 is increased, whereas in the case where a low gray scale image is displayed, a current flow rate to the laser light source 5 is reduced.

The laser light source 5 has three laser light sources 5a, 5b, and 5c for three red, green, and blue primary colors, for example, individually modulates red, green, and blue image signals, and outputs red, green, and blue laser beams. The red, green, and blue laser beams are combined at the reflecting mirror 6. It is noted that the reflecting mirror 6 includes a special optical element that reflects light with a specific wavelength and transmits light with other wavelengths, which is generally called a dichroic mirror having the following characteristics. For example, a reflecting mirror 6a reflects all the laser beams. A reflecting mirror 6b transmits the laser beam from the laser light source 5a, and reflects the laser beam from the laser light source 5b. A reflecting mirror 6c transmits the laser beams from the laser light source 5a and 5b, and reflects the laser beam from the laser light source 5c. Thus, the red, green, and blue laser beams can be combined in a single beam. The combined laser beam enters the MEMS 7. One of elements included in the MEMS 7 is a two-axis rotation mechanism, and a center mirror unit can be vibrated horizontally and vertically using the two-axis rotation mechanism. The MEMS driver 8 controls the vibrations of the mirror. It is noted that in FIG. 1, an example of the MEMS 7 is a two-axis MEMS device. However, the MEMS 7 can be configured by combining two single-axis MEMS devices.

The MEMS driver 8 generates a sine wave in synchronization with the horizontal synchronization signal from the image processing unit 2, generates a saw-tooth wave in synchronization with the vertical synchronization signal, and then drives the MEMS 7. The MEMS 7 receives the sine wave to perform sine wave motion in the horizontal direction, and at the same time, the MEMS 7 receives the saw-tooth wave to perform constant velocity motion in one direction of the vertical direction. Thus, a laser beam is scanned in a trace as on the display image 11 in FIG. 1, the scanning is synchronized with the modulation operation conducted by the laser driver 4, and then the inputted image is projected and displayed.

Here, the optical sensor 9 is disposed so as to detect the leaked light of the red, green, and blue laser beams combined at the reflecting mirror 6. Namely, the optical sensor 9 is disposed on the opposite side of the reflecting mirror 6c from the laser light source 5c. The reflecting mirror 6c has the characteristics of transmitting the laser beams from the laser light source 5a and 5b and reflecting the laser beam from the laser light source 5c. However, it is difficult to provide the characteristics of transmitting or reflecting the laser beams at 100 percent for the reflecting mirror 6c. Generally, the reflecting mirror 6c reflects a few percent of the laser beams from the laser light source 5a and 5b and transmits a few percent of the laser beam from the laser light source 5c at a few percent. Therefore, the optical sensor 9 is disposed at the position illustrated in FIG. 1, so that the reflecting mirror 6c can transmit a few percent of the laser beam from the laser light source 5c, and can reflect a few percent of the laser beams from the laser light source 5a and 5b, and the laser beams enter the optical sensor 9. The optical sensor 9 measures the light quantities of the incident laser beams, and outputs the values to the image processing unit 2. It is noted that for the optical sensor 9, a photodiode or an OEIC (Opto-Electronic Integrated Circuit) for an optical disk drive can be generally used.

Moreover, for measuring the temperature of the laser light source 5, the temperature sensor 10 is placed in contact with a location that is as close to the light source as possible on a structure mechanism (not illustrated) on which the laser light sources 5a, 5b, and 5c are fixed, and the temperature sensor 10 measures the temperature of the laser light source 5. For the temperature sensor 10, a thermistor element can be used.

Next, the white balance control performed by the image processing unit 2 will be described with reference to FIGS. 2 and 3.

Figure 2:
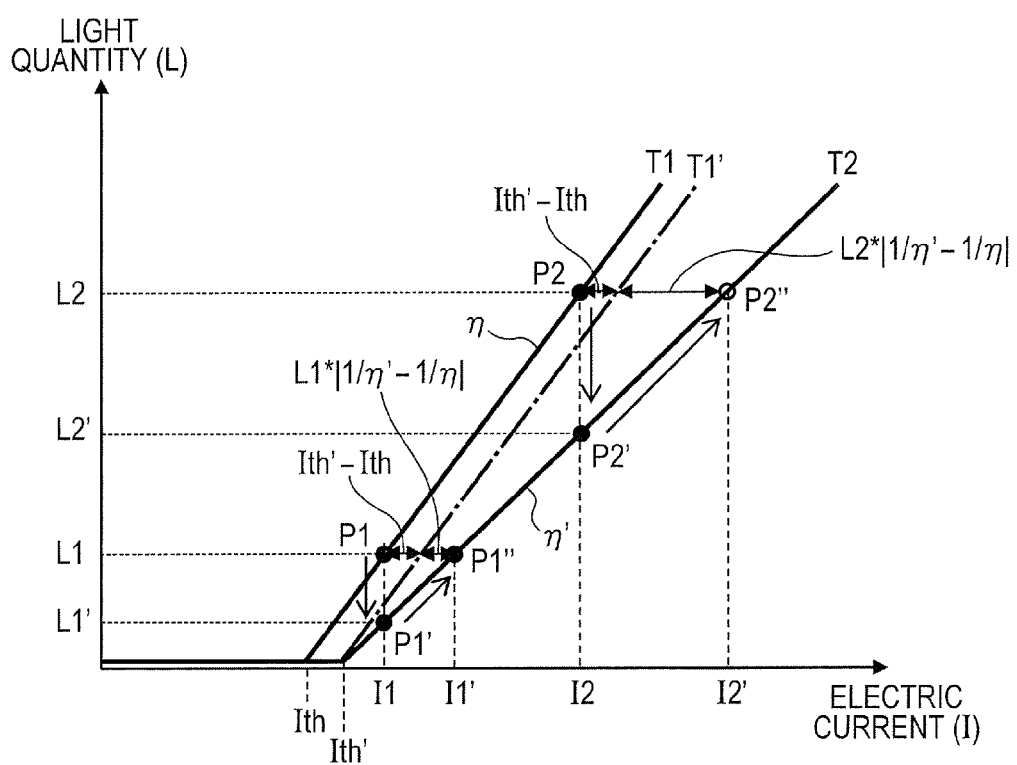
FIG. 2 is a characteristic diagram of the light quantity of a monochrome light source and the forward current characteristics according to the embodiment.

FIG. 2 is the characteristics of the light quantity (on the vertical axis) and the forward current (on the horizontal axis) of a laser.

As illustrated in FIG. 2, the light quantity and the forward current characteristics of a semiconductor laser are changed depending on a temperature change. In FIG. 2, there are two types of temperature conditions T1 and T2 in the relationship of expression T1<T2. As illustrated in FIG. 2, generally, such a tendency is observed in which when the temperature is increased, the threshold current of the forward current is increased (Ith<Ith' in FIG. 2), and the slope efficiency, which is a slope, is reduced (in FIG. 2, $\eta > \eta'$). Therefore, in the case where the drive current is constant, the temperature is changed and then the light quantity is also changed.

For example, in the current characteristics under the temperature condition T1, a light quantity L1 is at a point P1 at a current I1, and a light quantity L2 is at a point P2 at a current I2. Under the temperature condition T2, the light quantity L1 is at a point P1' at the current I1, and the light quantity L2 is at a point P2' at the current I2. The light quantities L1 and L2 are decreased even though the same electric current is carried.

Moreover, since the variations in the threshold and the slope efficiency are different in red, green, and blue laser beams, the brightness is changed as well as the white balance is changed when the temperature is changed.

Therefore, the light quantities L1 and L2 at the points P1 and P2 at the currents I1 and I2 under the condition T1 are measured, and the feedback is controlled in such a way that the light quantities L1 and L2 are constant all the time. Generally, such control is called APC (Auto Power Control). When the light quantities of red, green, and blue laser beams are constant, the white balance stays the same as well.

More specifically, first, the optical sensor 9 measures the light quantities L1 and L2 at two points (P1 and P2) at the temperature T1, and the image processing unit 2 approximates a straight line between the two points, and calculates a slope efficiency $\eta$ of the approximated straight line and the point Ith intersecting the X-axis at which the light quantity of the approximated straight line is zero. Similarly, the optical sensor 9 measures light quantities L1' and L2' at two points (P1' and P2') at the temperature T2, and calculates a slope efficiency and a point Ith'. The slope efficiencies $\eta$ and $\eta'$ and the points Ith and Ith' are changed depending on a temperature change. The slope efficiency $\eta$ and the point Ith in the first initial states are stored on the non-volatile memory 3, and a laser drive current is corrected in such a way that the light quantity is constant based on the slope efficiency and the point Ith' after the temperature is changed.

Namely, in order that the light quantity is constant, the current value is increased to a current value I1' in such a way that the light quantity at the point P1' is increased from the light quantity L1' to the light quantity L1 for moving at a point P1". The current value is increased to a current value I2' in such way that the light quantity at the point P2' is increased from the light quantity L2' to the light quantity L2 for moving at a point P2". A calculation method in which the current value I1 is moved to the current value I1' and the current value I2 is moved to the current value I2' is performed, in which first, the variation (Ith'−Ith) between the threshold currents is added as an offset to the current values I1 and I2 as an alternate long and short dash line T1' as illustrated in FIG. 2, and the variation of the slope efficiency is added to the current values I1 and I2. Although the calculation process in the midway point of the variation of the slope efficiency is omitted because the calculation process is a simple linear function, the calculated results are $L1 \times |1/\eta'-1/\eta|$ at the point P1" and $L2 \times |1/\eta'-1/\eta|$ at the point P2". It is noted that the reason why the calculated results are written in the absolute values is that in the case where the temperature conditions are T1>T2, such tendencies are observed in which current Ith' under the condition T2 is smaller than current Ith under the condition T1, thus making q', which is a slope, larger than causing $(1/\eta'-1/q)$ to be a negative value.

Figure 3:
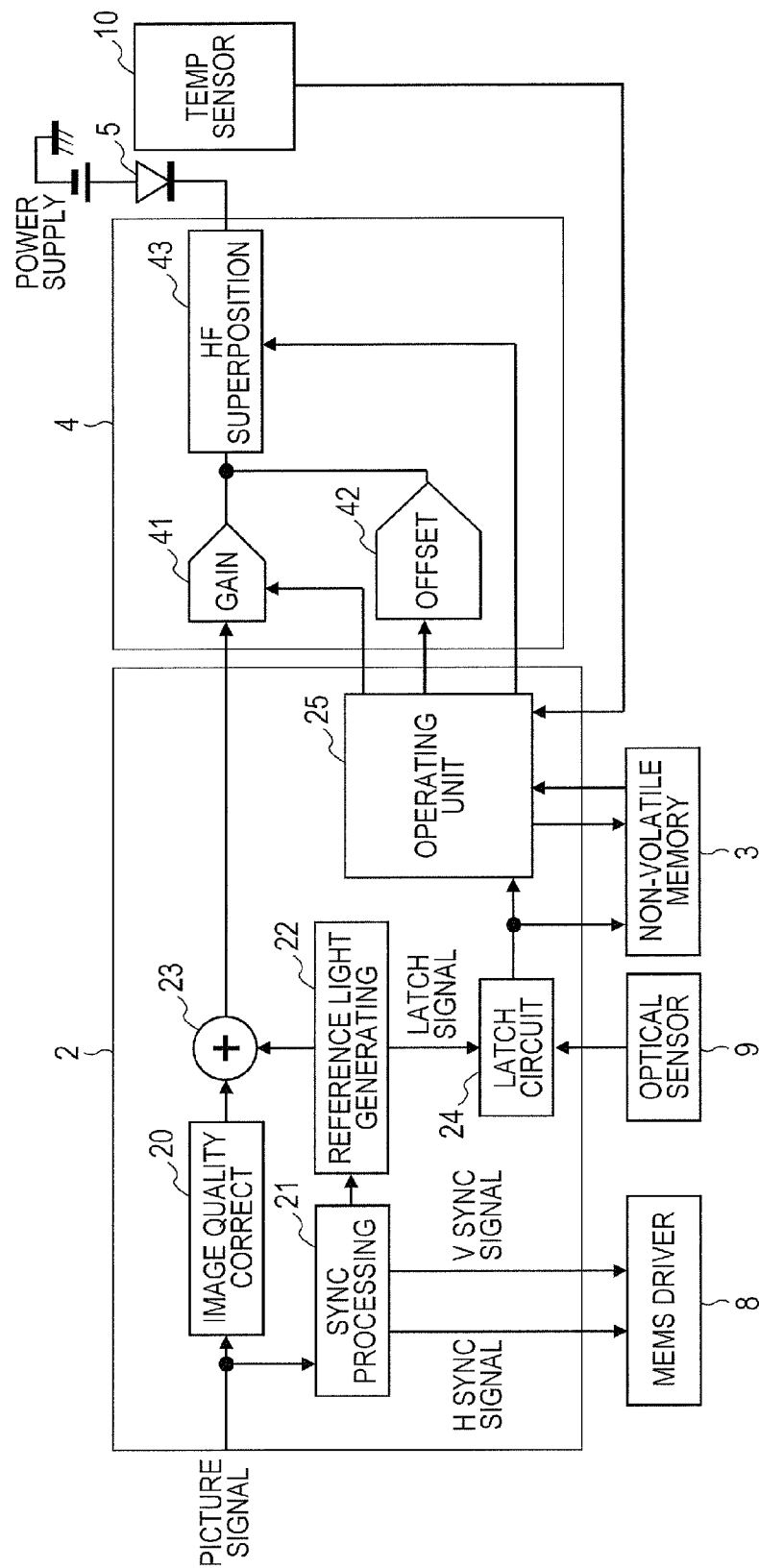
FIG. 3 is a block diagram of the internal configuration of an image processing unit according to the embodiment.

FIG. 3 is a block diagram of the internal configuration of the image processing unit 2. The image processing unit 2 corrects the laser drive current.

In the image processing unit 2, an image quality correcting unit 20 first performs, on a picture signal, general image quality correcting processes such as contrast adjustment, gamma correction, and image distortion correction. A synchronization processing unit 21 separates horizontal and vertical synchronization signals from the picture signal, and supplies the horizontal and vertical synchronization signals to a reference light generating unit 22 and the MEMS driver 8. It is noted that in the case where the horizontal and vertical synchronization signals are originally separated from the picture signal and inputted to the image processing unit 2, the synchronization processing unit 21 is only required to have a simple distribution function. However, in the case where the picture signal is inputted as a small amplitude differential signal as by LVDS (Low Voltage Differential Signaling), and the synchronization signals superposed on other signals, typically, picture signals, are transmitted, there is a need for a function to convert the differential signal into a parallel signal at CMOS level and to further separate the synchronization signals from the picture signal.

The reference light generating unit 22 is a timing and reference light level generating circuit that superposes, for a horizontal or vertical blanking period of the picture signal, signals expressing the light quantities L1 and L2 of reference light, which are light quantities at the points P1 and P2 on the currents I1 and I2 at the temperature T1 in FIG. 2. Here, for example, suppose that a signal expressing the light quantities L1 and L2 of reference light includes the level corresponding to the image level of an input image. Data representing the light quantities L1 and L2 of reference light with regard to the currents I1 and I2 at the temperature T1 is stored in the non-volatile memory 3.

Figure 4:
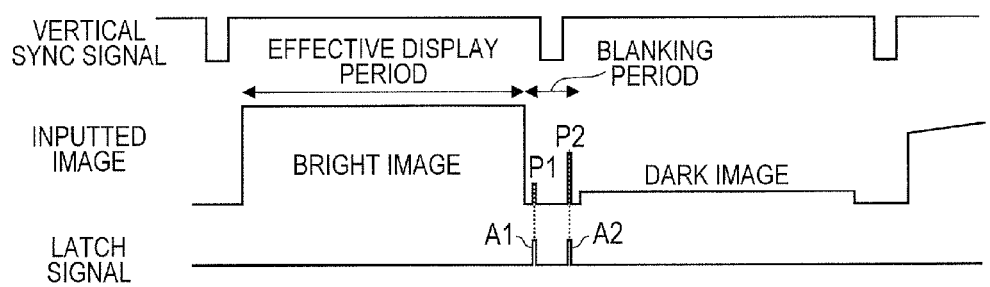
FIG. 4 is a timing chart of the operation of the image processing unit according to the embodiment.

FIG. 4 is a timing chart of the operation of the image processing unit 2 according to the embodiment.

Figure 5:
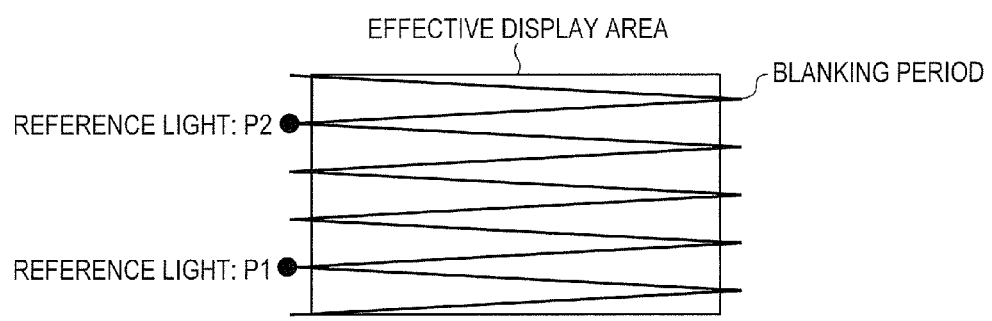
FIG. 5 is an illustration of the display positions of reference light according to the embodiment.

FIG. 5 is an illustration of the display positions of reference light according to the embodiment. FIGS. 4 and 5 illustrate the timing of superposing a signal expressing the light quantity of reference light on the blanking period of the picture signal.

As illustrated in an inputted image signal waveform in FIG. 4, points P1 and P2 at which a signal expressing the light quantities P1 and P2 of reference light is superposed are located in the blanking period, not in the effective display period. This is because when a signal is superposed in the effective display period, bright reference light is observed in a dark image, for example, and the image quality is degraded. Moreover, also in the case where a signal is superposed in the blanking period, the timing of superposing the signal is adjusted in such a way that the reference light is emitted when the laser beam comes at the left end or the right end in the blanking period as illustrated in FIG. 5. Furthermore, the horizontal direction of the picture signal is reduced at the image processing unit 2 in such a way that the timing is out at which the reference light is superposed on the display area in the effective display period, so that the reference light no longer comes in the effective display area. In addition, the positions of the reference light are physically shielded using the light shielding plate 12 illustrated in FIG. 1 on the emission side of the MEMS 7, so that the reference light may be made invisible.

An adder 23 adds or switches a reference signal to the picture signal at the timing and the level at which the reference signal is generated. A latch circuit 24 samples the output of the optical sensor 9 at the timing of a latch signal generated at the reference light generating unit 22 (A1 and A2 in FIG. 4), and stores actual light quantities L1' and L2' sampled at these timings into the non-volatile memory 3. In the case where the output of the optical sensor 9 is an analog output, the latch circuit 24 has an analog-to-digital (AD) conversion function in which the latch circuit 24 converts the analog output of the optical sensor 9 into a digital signal, and stores the digital signal on the non-volatile memory 3. In the case where the output of the optical sensor 9 corresponds to the digital output, the latch circuit 24 inquires the optical sensor 9 about the digital output at the timing of A1 and A2 in FIG. 4, temporarily takes in data, and stores the data on the non-volatile memory 3.

An operating unit 25 computes the variation (Ith'−Ith) between the threshold currents and the variation of the slope efficiencies ($L1 \times |1/\eta'-1/\eta|$, $L2 \times |1/\eta'-1/\eta|$) described in FIG. 2 based on the reference light data L1 and L2 stored on the non-volatile memory 3, the light quantities at L1' and L2' measured at the optical sensor 9, and the temperatures T1 and T2 of the laser light source 5 measured at the temperature sensor 10, and controls a gain circuit 41 and an offset circuit 42 in the laser driver 4. More specifically, the gain circuit 41 is controlled using the variation of the slope efficiency, and the offset circuit 42 is controlled using the variation of the threshold current. The laser driver 4 supplies the currents I1' and I2' thus obtained to the laser light source 5, thereby making the light quantity independent on temperature. Consequently, white balance variation due to temperature change is suppressed.

A period in which the reference signal is superposed may generally range from about a few 10 μs to a few 100 μs in consideration of the response time of the optical sensor 9 and the AD conversion time at the latch circuit 24. In FIG. 3, an HF superposition circuit 43 is provided in a stage following the gain circuit 41 and the offset circuit 42. Descriptions about the HF superposition circuit 43 will be provided in the following context.

The foregoing description concerns compensation for temperature-dependent white balance variation when the drive current for the laser light source 5 is relatively large, namely, under the condition of relatively high brightness, for instance, as illustrated in FIG. 2. However, there is a further difficult problem when the drive current is small, namely, in a region of low brightness. With low brightness, there appears a characteristic in which the light quantity rises steeply with increase of forward current, e.g., around the current value of Ith or Ith'. In consequence, because the light quantity diminishes around the current value of Ith, especially in a range of current values smaller than Ith, there would be a large error in the measurement values of the optical sensor 9 and a large error in the difference values of light quantity between two current values. Moreover, with current values just before and after Ith, the foregoing different values of light quantity are extremely different, which results in a decrease in computational accuracy. Hence, it is hard to compensate for temperature-dependent white balance variation with adequate accuracy. Therefore, in the present embodiment, a method as will be described below is used to improve white balance in low brightness.

Then, a method is described for smoothing the light quantity versus forward current characteristic that is steep in low brightness by means of high frequency (HF) superposition as will be described below and making white balance stable continuously from high brightness to low brightness.

Figure 6:
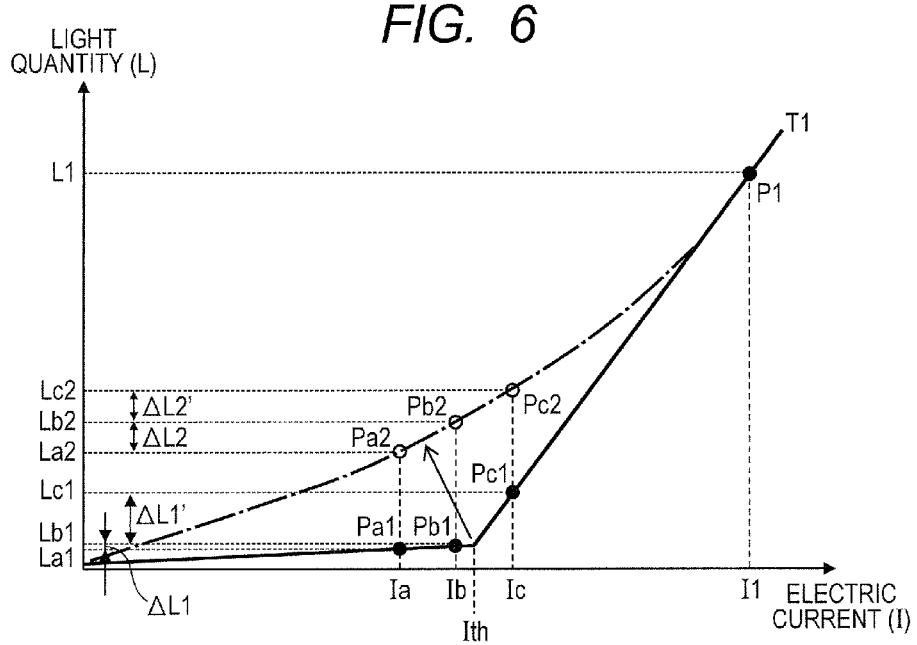
FIG. 6 is a characteristic diagram representing the light quantity versus forward current characteristic in low brightness according to the embodiment.

FIG. 6 is a characteristic diagram representing the light quantity versus forward current characteristic in low brightness in the present embodiment. This diagram enlarges and presents a range of current values around Ith against FIG. 2.

The HF superposition circuit 43 mounted within the laser driver 4 performs HF superposition which means superposing a high frequency (HF) signal on a picture signal supplied from the image processing unit 2, based on a value set by the operating unit 25. Thereby, the values of light quantities at current values before and after each current value are integrated and the light quantity versus forward current relation which changed steeply as a line with points Pa1, Pb1, and Pc1 becomes to change smoothly as indicated by an alternate long and short dash line with points Pa2, Pb2, and Pc2 in FIG. 6.

For example, if HF superposition is not performed, the light quantities La, Lb, and Lc at the current values Ia, Ib, and Ic are La1, Lb1, and Lc1, and the differences between neighboring light quantities are $\Delta L1$ and $\Delta L1'$. However, if HF superposition is performed, the corresponding light quantities become La2, Lb2, and Lc2 and the corresponding differences become $\Delta L2$ and $\Delta L2'$.

The differences $\Delta L1$ and $\Delta L1'$ when HF superposition is not performed are large, which deteriorates computational accuracy significantly, whereas the differences $\Delta L2$ and $\Delta L2'$ when HF superposition is performed are small and stable, so they improve computational accuracy and facilitate white balance adjustment. HF superposition in this case is performed to a relatively small degree for each color so that it does not affect a displayed image or the like.

Figure 7:
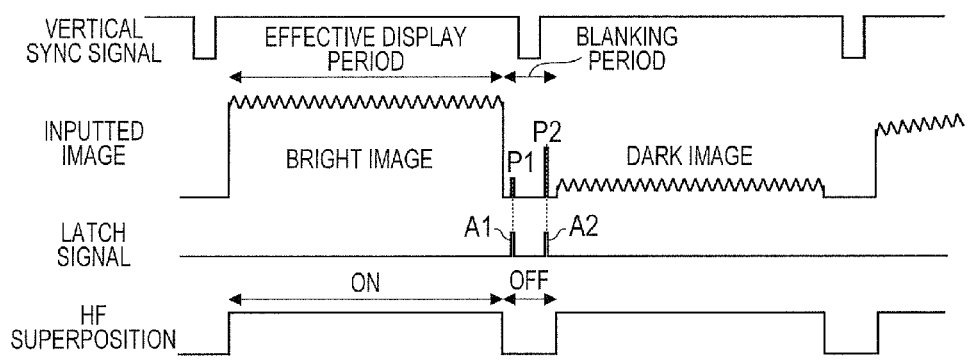
FIG. 7 is a timing chart of the operation of the image processing unit according to the embodiment.

FIG. 7 is a timing chart representing picture signal processing when HF superposition is performed in the present embodiment.

HF superposition is only performed on a signal during an effective display period. Doing aims to prevent that even the reference light P1, P2 for a blanking period is modulated by the HF superposition and noise is superposed on the reference light. Hence, HF superposition is not performed during the blanking period of a picture signal.

Figure 8:
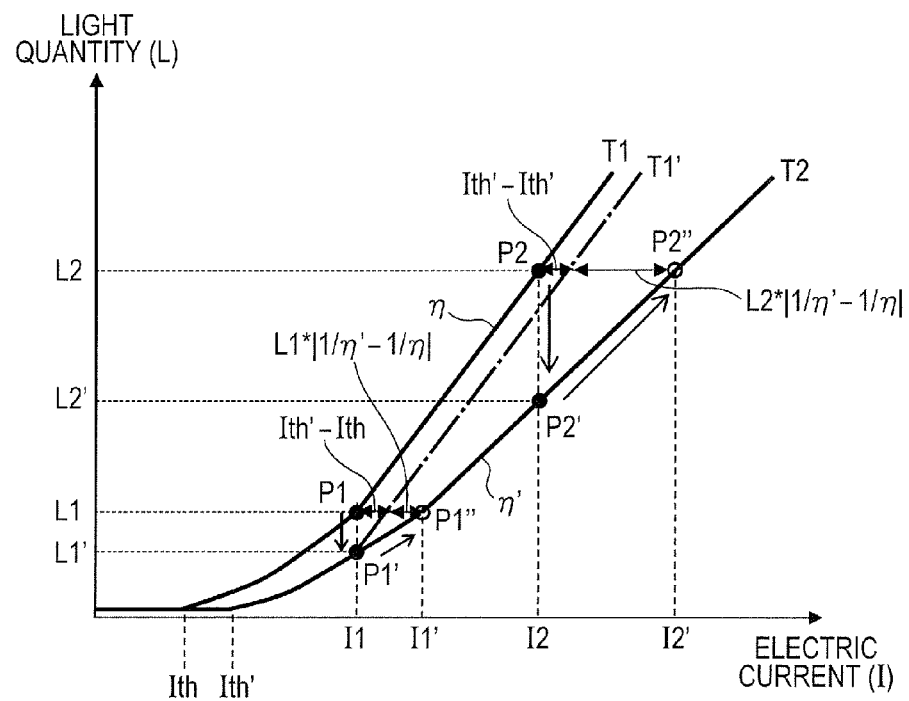
FIG. 8 is a characteristic diagram of the light quantity of a monochrome light source and the forward current characteristics according to the embodiment.

FIG. 8 is a characteristic of the light quantity of the laser versus forward current when HF superposition is performed in the present embodiment, assuming a case where HF superposition described with FIGS. 6 and 7 has been performed. Unlike in the case of FIG. 2, the characteristic around the current values Ith and Ith' rises smoothly by the effect of HF superposition performed, and it can be seen that white balance that is stable from low brightness to high brightness is obtained.

It is preferable that a signal to be superposed when HF superposition is performed has a frequency of, e.g., 50 MHz or more in a frequency band making it hard to notice visually. Alternatively, the signal may have an interleaved frequency with respect to, e.g., a horizontal synchronization frequency fh, which is represented by $(n+\frac{1}{2})$ fh, where n is an integer.

Control with regard to temperature change, described with FIG. 2 or FIG. 8, does not need to be always performed (for example, on a per-millisecond basis) on the time axis. Such control may be performed depending on the situation; if temperature change occurs within a short period of time, for instance, just after the power is turned on, control should be performed at short intervals (e.g., on a per-millisecond or per-second basis); and after temperature change has stabilized, control should be performed at long intervals (e.g., in units of minutes).

Signals to be superposed on three red, green, and blue signals, respectively, may have different frequencies or amplitudes. If signals with different frequencies are superposed on the R, G, and B signals, there is no fear that the superposed signals generate a zero beat in a displayed image. If signals with different amplitudes are superposed on the R, G, and B signals, a signal with an amplitude suitable for the characteristic of the light source of each color can be superposed.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An image display device that externally projects generated light and displays an image, the image display device comprising:
   a light source configured to generate the light;
   a light source drive unit configured to superpose a high frequency (HF) signal on a picture signal supplied, drive the light source, and control, typically, a light quantity of the light;
   a reflecting mirror configured to reflect light generated at the light source and externally project the light, a direction to reflect the light being movable;
   a reflecting mirror drive unit configured to drive the reflecting mirror and control the direction to reflect the light based on a synchronization signal supplied;
   an image processing unit configured to process a first picture signal inputted to the image display device, supply a second picture signal for the image externally displayed to the light source drive unit, and supply a synchronization signal for the second picture signal to the reflecting mirror drive unit;
   an optical sensor configured to measure a light quantity of light generated at the light source and supply a measured value to the image processing unit; and a temperature sensor configured to measure a temperature of the light source and supply a measured value to the image processing unit, wherein the image processing unit superposes a signal based on a first measured value of the light quantity measured at the optical sensor on the second picture signal to be supplied to the light source drive unit in a state in which the light source drive unit is set to drive the light source at a set first temperature; and the image processing unit controls the light source drive unit so that a second measured value at a second temperature comes close to the first measured value at the first temperature as a target value based on the second measured value at which a light quantity of light generated at the light source is measured at the optical sensor at the second temperature different from the first temperature on the signal based on the first measured value.

2. The image display device according to claim 1, wherein the state in which the light source drive unit is set to drive the light source depends on a current value at which the light source drive unit drives a light source.

3. The image display device according to claim 2, wherein the first measured value at the first temperature and the second measured value at the second temperature are measured values of current values at two points at which the light source drive unit drives a light source.

4. The image display device according to claim 2, wherein the current value at the second temperature is set by first-order approximation, based on measured values of light quantity measured by the optical sensor at two current values at the first temperature.

5. The image display device according to claim 1,
wherein the light source includes a red light source, a green light source, and a blue light source; and
the light source drive unit superposes the high frequency signals with frequencies or amplitudes that differ from one another on respective picture signals for the red light source, the green light source, and the blue light source.

6. The image display device according to claim 1, wherein, in the light source drive unit, superposition of a signal based on the first measured value of the light quantity measured by the optical sensor is performed during a blanking period of the second picture signal, and, in the light source drive unit, superposition of a high frequency signal is performed during an effective display period of the second picture signal.

7. The image display device according to claim 1, wherein the light source is a light source using a laser diode.

* * * * *